Figure 1:
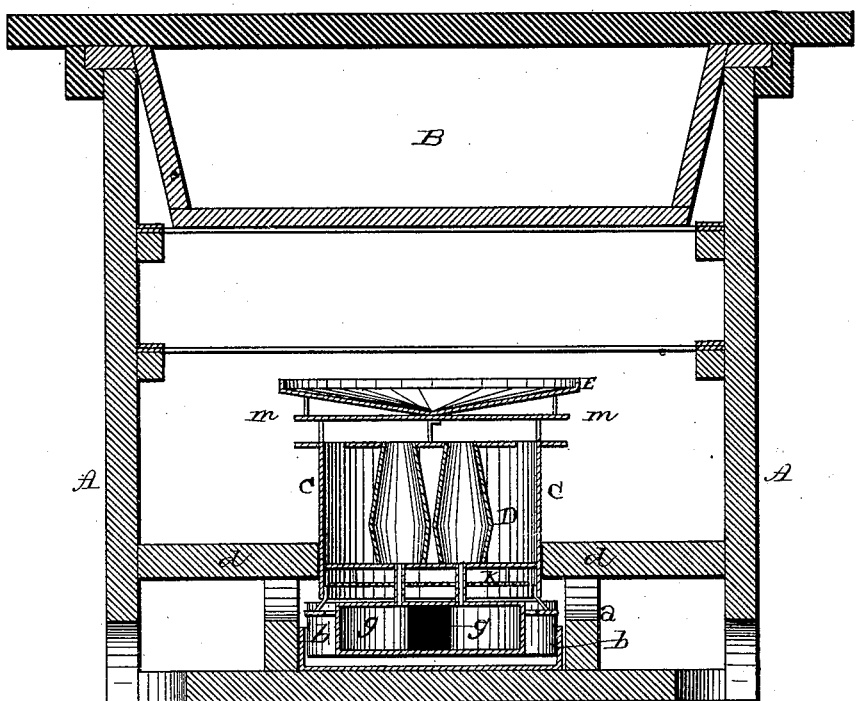
Figure 2:
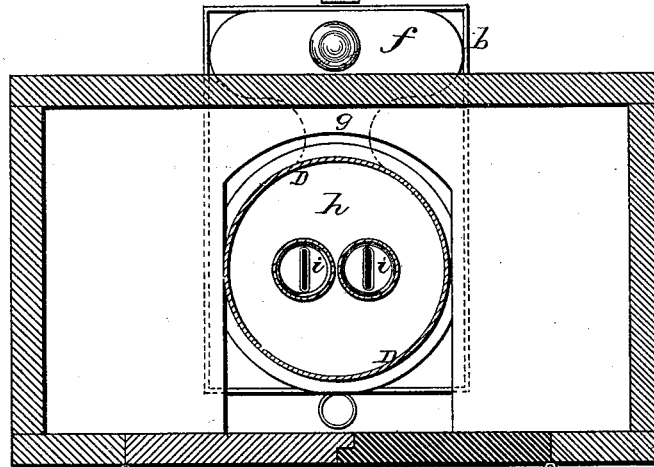
Figure 3:
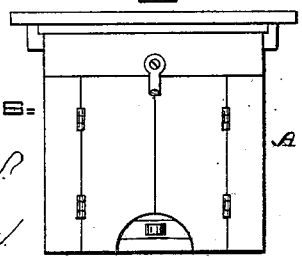
Figure 4:
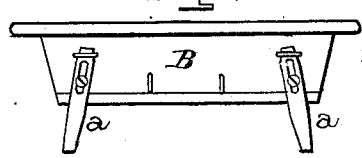

W. J. SNYDER.
Dough-Raiser.

No. 206,274. Patented July 23, 1878.

Witnesses:
J. W. Garner
W. S. D. Haines

Inventor:
Wm. J. Snyder
per
J. A. Lehmann,
atty.

N. PETERS, PHOTO-LITHOGRAPHER, WASHINGTON, D. C.

UNITED STATES PATENT OFFICE.

WILLIAM J. SNYDER, OF MANOR STATION, PENNSYLVANIA.

IMPROVEMENT IN DOUGH-RAISERS.

Specification forming part of Letters Patent No. 206,274, dated July 23, 1878; application filed June 17, 1878.

*To all whom it may concern:*

Be it known that I, WILLIAM J. SNYDER, of Manor Station, in the county of Westmoreland and State of Pennsylvania, have invented certain new and useful Improvements in Bread-Trays for Making and Raising Dough; and I do hereby declare the following to be a full, clear, and exact description of the invention, such as will enable others skilled in the art to which it pertains to make and use it, reference being had to the accompanying drawings, which form part of this specification.

My invention relates to an improvement in bread-trays for making and raising dough; and it consists in a frame or box in which the tray is placed, and an arrangement for applying a desired degree of heat to the tray while in it the dough is being kneaded, and under the tray a chamber, into which the dough is to be exposed to an increased temperature, for the purpose of raising the same quickly, the heat being obtained from a furnace constructed for that purpose and regulated according to the indications of a thermometer, as will be fully described hereinafter.

The accompanying drawings represent my invention.

A represents a frame or box, provided in front with folding doors, in which there is an opening at the bottom. In the upper part of the box is the movable tray B, covered by a sliding lid. The bottom of the tray is smaller than the upper open part, causing the sides to slant, as shown, to allow the heat from the furnace underneath to surround it. This form of the tray also gives room for folding legs $a$ to be attached to its outside, upon which it may be made to stand when removed from its place in the box. During the process of mixing and kneading of the dough the temperature of the whole mass is raised, and the time necessary for raising the dough before baking is thereby considerably shortened.

Under the tray B, within the box, are the shelves for bread-pans, which shelves rest upon cleats at the inside of the box. In the middle on the bottom of the box stands the furnace C, its legs resting in the sliding tray $b$, which tray, with the furnace, may be drawn out, guided between the fixed shelves $d$. This tray $b$ may partly be pushed through the box A, through an opening at the rear of it, for a purpose hereinafter mentioned.

The furnace is heated by means of carbon-oil, which is contained in a tank, $f$, connected by a narrow neck, $g$, with a basin, $h$, containing the wicks and oil. The tank, neck, and basin are of one piece, and stand on a level with each other. The former, is for convenience, of an oval form, with its greater diameter across the box, and the latter circular in front of the former. The communication between the tank and the basin is covered with wire-gauze, or its equivalent, to prevent a flame from passing from one to the other, and a plate, K, of similar material, surrounds the wick-tubes on top of the oil-basin $h$ for a like purpose. On top of the neck $g$ is an opening with a screw-cover, through which the wicks may be reached when necessary; but the oil is introduced through an aperture, similarly protected, on top of the tank $f$.

The wick-tubes and plate K are surrounded by a cylinder, D, in which are secured the chimneys for the flames, which chimneys are considerably wider at the bottom than at the top, and slightly oblate, terminating at the height of the cylinder. On a rim around the upper edge of the cylinder D, but separated therefrom by a space to allow a passage of air, rests a circular plate, $m$, which receives the heat of the flames and distributes the same; but being of less diameter than the bottom of the basin E, just above it, this latter receives the heat from the plate $m$, and distributes it still further.

The bottom of the basin E is in the shape of a reflector, its convex side downward, for the purpose of causing the heat from the plate $m$ to be rapidly dispersed in all directions, while its upper side, surrounded by a rim, serves as a basin for holding water to supply by evaporation a degree of moisture to the air necessary for the well raising of dough, and also to carry off a superabundance of heat from the furnace to insure safety.

The tank $f$ stands in front of an opening in the rear part of the box when the fire is not ignited; but when in operation the tray $b$ is pushed partly through this opening, to remove the tank $f$ outside of the box, there to be kept cool by the outer atmosphere, to prevent any accidental ignition of the oil. A thermometer is to be suspended within the chamber, to indicate the degree of heat pervading.

It is evident that the heated chamber may advantageously be used for other purposes, such as for drying fruit, souring milk, &c. I therefore do not confine myself to the raising of dough for baking alone.

I am aware that others have attempted to attain similar results by means well known to the public, and these I disclaim; but

What I claim as my own invention is—

1. In a tray for raising dough, the combination of a frame, A, tray B, a furnace, C, consisting of the body $h$, cylinder D, for surrounding the chimneys, deflector $m$, and convex basin E, the deflector $m$ being of less diameter than the basin, substantially as shown.

2. The combination of a tray with slanting sides and folding legs, and a furnace underneath, substantially as described, and for the purpose set forth.

In testimony that I claim the foregoing I have hereunto set my hand this 8th day of June, 1878.

WILLIAM J. SNYDER.

Witnesses:
   JOSEPH LENHART,
   ROBERT HANNA.